United States Patent [19]

Weber et al.

[11] Patent Number: 5,171,810

[45] Date of Patent: * Dec. 15, 1992

[54] CROSSLINKABLE POLY(UNSATURATED CARBOSILANE) COPOLYMERS AND METHODS OF MAKING SAME

[75] Inventors: William P. Weber, Los Angeles; Stephen Q. Zhou, San Gabriel, both of Calif.

[73] Assignee: University of Southern California, Los Angeles, Calif.

[*] Notice: The portion of the term of this patent subsequent to Dec. 8, 2009 has been disclaimed.

[21] Appl. No.: 758,638

[22] Filed: Sep. 12, 1991

Related U.S. Application Data

[63] Continuation-in-part of Ser. No. 636,639, Dec. 29, 1990.

[51] Int. Cl.$^5$ ................ C08F 134/00; C08F 130/08
[52] U.S. Cl. .................... 526/279; 526/179; 526/180; 526/181; 528/14; 528/31; 528/40
[58] Field of Search ............... 526/279, 90, 190, 179, 526/180, 181

[56] References Cited

PUBLICATIONS

Y. T. Park et al. (1990) Macromol 23, 1911–1915.
S. Q. Zhou et al (1990) Macromol 23, 1915–1917.
W. P. Weber et al (1990) Polymer Preprints 31(1), 44–45.
Yajima, S., et al., *J. Mater. Sci.*, 1978, 13, 2569.
Hirao, A. et al., *Macromolecules*, 1987, 20, No. 7, 1505.
Lammens, H., et al., *Pol. Let.*, 1971, 9, 341.
Finkel'shtein, E. Sh., et al., *Izvestiva Akademii Nauk SSR, Seriya Khimicheskaya*, 1981, 3, 641.
Horvath, R. H.; Chan, T. H., *J. Org. Chem.*, 1981, 52, No. 20, 4499.

*Primary Examiner*—Joseph L. Schofer
*Assistant Examiner*—M. Nagumo
*Attorney, Agent, or Firm*—Connolly & Hutz

[57] ABSTRACT

Random or block copolymers with (1-hydro-1-R-1-sila-cis-pent-3-ene), poly(1-hydro-1-R-3,4 benzo-1-sila pent-3-ene), and disubstituted 1-silapent-3-ene repeating units of the general formula

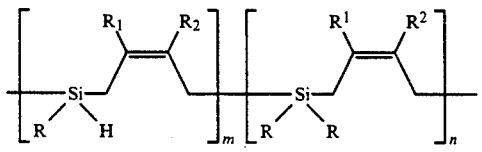

where R is hydrogen, an alkyl radical containing from one to four carbon atoms or phenyl, $R^1$ is hydrogen, an alkyl radical containing from one to four carbon atoms, phenyl or a halogen and $R^2$ is hydrogen, or $R^1$ and $R^2$ are combined to form a phenyl ring, are prepared by the anionic ring opening polymerization of silacyclopent-3-enes or 2-silaindans with an organometallic base and cation coordinating ligand catalyst system or a metathesis ring opening catalyst system.

14 Claims, No Drawings

CROSSLINKABLE POLY(UNSATURATED CARBOSILANE) COPOLYMERS AND METHODS OF MAKING SAME

This invention was made with Government support under Contract No. AFOSR-89-0007 by the Air Force Office of Scientific Research and Contract No. N00014-89-J-1961 by the Department of the Navy. The Government has certain rights in this invention.

This is a continuation-in-part of our copending application Ser. No. 636,639 filed Dec. 29, 1990.

BACKGROUND OF THE INVENTION

1. Field of the Invention

This invention relates to poly(carbosilane) copolymers and methods of making the same.

2. Discussion of Relevant Art

Poly(methylhydrosiloxanes) having repeating units of the formula:

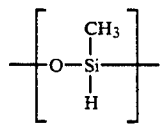

are well known. They can be prepared by hydrolysis of methyldichlorosilane or acid catalyzed ring opening polymerization of sym-tetramethylcyclotetrasiloxane. Poly(methylhydrosiloxanes) contain reactive hydride groups bound to the silicon atoms. The poly(methylhydrosiloxanes) can be crosslinked to produce elastomeric products or reacted with unsaturated monomers to yield graft copolymers.

It is also known that poly(dimethylsilane) fibers can be pyrolytically converted into silicon carbide fibers. In S. Yajima et. al., *J. Mater. Sci.* 13, 2569 (1978), it is proposed that poly(methylsilylene methylene) having repeating units of the formula:

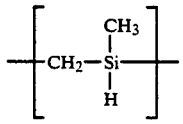

is an intermediate in the formation of the silicon carbide fibers by this process.

The anionic polymerization of (4-vinylphenyl)dimethylsilane to produce poly[(4-vinylphenyl)dimethylsilane] is described in Hirao, A. et. al., *Macromolecules* 1987, 20, 1505. This anionic addition polymerization of carbon-carbon double bonds of (4-vinylphenyl)dimethylsilane produces polymers having repeating units of the formula:

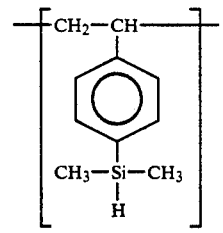

The preparation of poly(1,1 dimethyl-1-silapent-3-ene) by the metathesis ring-opening polymerization of 1,1-dimethyl-1-silacyclopent-3-ene using a $WCl_6/Na_2O_2/Al(isoBu)_3$ catalyst system is disclosed in Lammens, H. et. al., *Pol. Let.* 1971, 9 341 and Finkel'shtein, E. Sh. et. al., *Izvestiva Akademii Nauk SSSR, Seriya Khimicheskaya* 1981, 3, 641. The preparation of poly(1,1-dimethyl-1-silapent-3-ene) and poly(1-1-diphenyl-1-silapent-3-ene) from 1,1-dimethyl-1-silacyclopent-3-ene and 1,1-diphenyl-1-silacyclopente-3-ene, respectively, by anionic ring-opening polymerization using butyllithium as a catalyst is disclosed in Horvath, R. H.; Chan, T. H., *J. Org. Chem.* 1971, 20, 4498. Anionic polymerization of 1-methyl-1-silacyclopent-3-ene to form a homopolymer is described in Macromolecules 23, 1915 (1990) and "Anionic Ring Opening Polymerization of 2-Methyl-2-Silaindan. Characterization of the Polymer and Mechanism of Polymerization" by S. Q. Zhou, et al and in *Makromolekulare Chemie Rapid Communications*, 11, 19–24 (1990) by S. Q. Zhou et al.

SUMMARY OF THE INVENTION

Now there has been discovered novel poly(1-hydro-1-R-1-silacis-pent-3-ene) copolymers and poly(1-hydro-1-R-3,4 benzo-1-silapent-3-ene) copolymers, hereinafter collectively referred to as "poly(unsaturated carbo-1-H-silane) copolymers". Unlike the poly(carbosilane) polymers known in the art, some of the silane segments of the polymers in accordance with the invention contain reactive silicon-hydride bonds, while the hydrocarbon segment contains cis carbon-carbon double bonds. This combination of functional groups is useful for modifying or crosslinking the polymers. For example, the polymers form high yields of ceramic material upon thermolysis.

The repeating units of the polymers are represented by the general formula

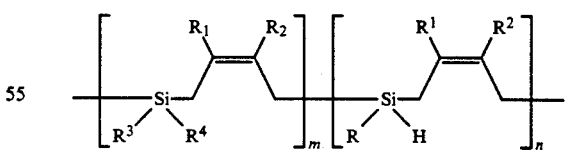

where R is hydrogen, an alkyl radical containing from one to four carbon atoms (preferably methyl) or phenyl. $R^1$ is hydrogen, alkyl radical containing from one to four carbon atoms (preferably methyl), phenyl or a halogen and $R^2$ is hydrogen, or $R^1$ and $R^2$ are combined to form a phenyl ring. $R^3$ and $R^4$ are an alkyl radical containing from one to four carbon atoms (preferably methyl) or phenyl; m and n are integers with the sum of m and n being at least 10 and with the ratio of m/n ranging from about 1/9 to about 9/1.

The repeating units of the polymers are further represented by the formula

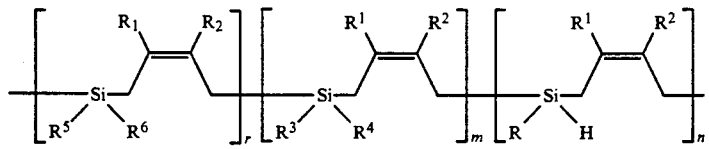

wherein R, $R^1$, $R^2$, $R^3$, $R^4$, m and n are as defined above and $R^5$ and are an alkyl radical containing one to four carbon atoms (preferably methyl) or phenyl with the proviso that $R^5$ and $R^6$ are not both identical to $R^3$ and $R^4$; and r is an integer with the sum of r and m+n being at least 10 and the ratio of r/m+n ranging from about 1/9 to 9/1.

There has also been discovered a novel method for making such poly(carbo-1-H-silane) copolymers. Surprisingly, they are formed by the anionic ring opening polymerization of silacyclopent-3-enes or 2-silaindans with an organometallic base and cation coordinating ligand catalyst system. Under the conditions for anionic ring opening polymerization, the hydride could be expected to be leaving group in a nucleophilic substitution reaction by the alkyl anion. This would result in the replacement of the hydride by the alkyl group. The copolymers of this invention are also prepared by ring opening metathesis polymerization. The ring opening metathesis polymerization of silylhydride bearing cyclic carbosilane monomers has never been reported in the prior art. Indeed, those skilled in the art would believe that the silylhydride groups would reduce the tungsten complexes needed to catalyze the polymerization.

DETAILED DESCRIPTION OF THE PREFERRED EMBODIMENTS

The poly(1-hydro-1-R-1-sila-cis-pent-3-ene) and poly(1-hydro-1-R-3,4 benzo-1-silapentene) copolymers, hereinafter collectively referred to as "poly(unsaturated carbo-1-H-silane) polymers", are formed by the stereospecific anionic ring opening polymerization of 1-H-silacyclopent-3-ene or 2-H-2-silaindan monomers of the general formulas:

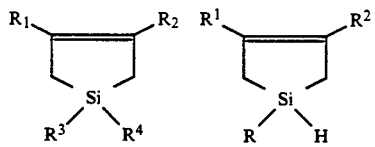

where
R is hydrogen, an alkyl radical containing from one to four carbon atoms or phenyl;
$R^1$ is hydrogen, an alkyl radical containing from one to four carbon atoms, phenyl or a halogen and $R^2$ is hydrogen, or $R^1$ and $R^2$ are combined to form a phenyl ring;
$R^3$ and $R^4$ are an alkyl radical containing one to four carbon atoms (preferably methyl) or phenyl.

Representative monomers include 1-methyl-1-silacyclopent-3-ene, 1-phenyl-1-silacyclopent-3-ene, 1,1-dihydro-1-silacyclopent-3-ene, 2-methyl-2-silaindan, 2-ethyl-2-silaindan, 2-phenyl-2-silaindan, and 2,2-dihydro-2-silaindan. Preferred monomers include 1-methyl-1-silaoyclopent-3-ene and 2-methyl-2-silaindan.

Representative comonomers include 1,1-dimethyl-1-silacyclopentent-3-ene, 1,1-diphenyl-1-silacyclopente-3-ene, 1,1-diethyl-1-silacyclopent-3-ene, 1,1,3-trimethyl-1-silacyclopent-3-ene, 3-chloro-1,1-dimethyl-1-silacyclopent-3-ene, 1-methyl-1-phenyl-1-silacyclopent-3-ene, 2,2-dimethyl-2-silaindan, 2,2-diphenyl-2-silaindan, 2,2-dimethyl-2-silaindan 2-methyl-2-phenyl-2-silaindan. Preferred comonomers include 1,1-dimethyl-1-silacyclopent-3-ene, 1,1,3-trimethyl-1-silacyclopent-3-ene, and 2,2-dimethyl-2-silaindan.

As illustrated by the following reaction scheme, the monomers are typically prepared by reacting a 1,3-diene with a dichlorosilane and a metal, such as magnesium, in polar solvent, such as THF or diethyl ether.

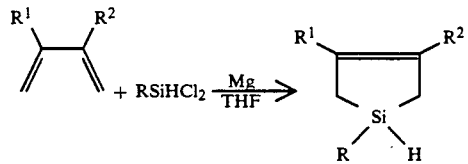

The ring opening polymerization reaction proceeds readily at low temperatures, e.g. from about $-20°$ C. to about $-78°$ C., and at ambient pressures to produce copolymers having repeating units of the general formula

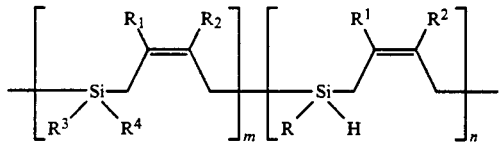

where R, $R^1$, $R^2$, $R^3$, $R^4$, m and n have the same meanings as above. Occasional displacement of a hydride by an allylic or benzylic anion group can occur. Such displacements result in chain branching.

The ring opening polymerization in accordance with this invention is carried out in the presence of known anionic ring-opening catalyst systems. Such catalyst systems include organometallic base and cation coordinating ligand catalyst systems, such as an alkyllithium and hexamethylphophoramide (HMPA) dimethylpropyleneurea (DMPU) or N,N,N',N'-tetramethylethylenediamine (TMEDA) catalyst systems.

The alkyllithium catalysts are used in conjunction with cation coordinating ligands, such as hexamethylphophoramide (HMPA), N,N,N',N'-tetramethylethylenediamine (TMEDA), N,N'-dimethylpropyleneurea, dimethylformamide or dimethylacetamide, in a polar solvent such as tetrahydrofuran (THF).

The formation of copolymers having a silicon-hydride functional group is surprising, particularly since the reaction apparently requires nucleophilic coordination at the silyl center. Unexpectedly, the alkyl anion appears to form a pentacoordinate silicon intermediate, which opens the silacyclopent-3-ene or 2-silaindan ring to stereospecifically form a cis allyl or benzyl anion, respectively. The allylic or benzylic anion rapidly attacks the silicon atom on another ring in the propagating step of a polymerization reaction. Under the conditions for the anionic ring opening of the 1-H-silacyclopent-3-ene or 2-H-2-silaindan monomers, with an alkyl lithium catalyst, the hydride could be expected to be a leaving group in an nucleophilic substitution reaction by the alkyl anion. This would result in the replacement of the hydride group by the alkyl group.

The monomers of this invention can be copolymerized by ring opening metathesis catalyst systems such as tungsten hexachloride, tetramethyltin, or tetraphenyltin either neat or in solvents such as chlorobenzene. This is an illustration of the type of catalyst that can be used and not a limitation on the catalyst composition.

By varying the composition and relative amounts of the comonomers, it is possible to select comonomer combinations which produce polymers having a wide range of properties and physical forms. The polymers can be tacky solids, elastomers, or thermoplastic solids having glass transition temperatures about room temperature.

The polymers can be processed thermally to produce various fabricated forms. The polymers can be combined with conventional particulate or fibrous fillers and processed by blending extrusion molding, injection molding, compression molding, pultrusion or stamping to form rods, sheets, or molded articles. Solutions containing the polymers can be coated on the surfaces of substrates to provide adhesion, environmental protection, or selective permeability.

The polymers can be modified or crosslinked to change their physical and chemical properties. The polymers can be modified by reacting the silicon-hydrogen bond, the carbon-carbon double bond or both. Representative reactions of the silicon-hydrogen bond include oxidation to Si—OH or conversion to Si—Cl, which can then be hydrolyzed to Si—OH bonds. Condensation of the silanols results in formation of siloxanes.

Representative reactions of the carbon-carbon double bonds are ionic and free radical addition reactions, such as catalytic hydrogenation, hydroboration, and the like. The permeability of polymer coatings, for example, can be varied by adding halocarbon or silane groups through addition reactions with the carbon-carbon double bond. The adhesiveness of such coatings can be increased by reacting polar groups, such as alkoxysilanes, to the carbon-carbon double bonds.

The presence of olefinic unsaturation provides convenient sites for subsequent vulcanization or cross-linking by ionic, free radical or thermal means known to the art. For example, the polymers can be crosslinked in the presence of chloroplatinic acid.

The following examples are included to further illustrate the invention. They are not limitations thereon.

NMR spectroscopy: $^1H$, $^{13}C$ and $^{29}Si$ NMR spectra were obtained either on an IBM Brucker 270-SY or a Brucker AM-360 spectrometer operating in the Fourier transform mode. $^{13}C$ NMR spectra were run with broad band proton decoupling. A heteronuclear gated decoupling pulse sequence with a pulse delay of 20 s(NONOE) was used to obtain $^{29}Si$ NMR spectra. Ten to fifteen per cent solutions in $CDCl_3$ were used to obtain $^{13}C$ and $^{29}Si$ spectra. Five per cent solutions were used to obtain $^1H$ NMR spectra. $^{29}Si$ NMR spectra were externally referenced to TMS.

IR Spectroscopy: IR spectra were recorded on a Perkin Elmer PE-281 spectrometer.

UV Spectroscopy: UV spectra were recorded on a Shimadzu-260 UV visible spectrometer. Spectra quality THF was used to prepare solutions for UV spectroscopy.

Gel permeation chromatography (GPC): The molecular weight distribution of the polymer was performed on a Waters system. This was comprised of UGK injector, a 510 pump, a R401 differential refractometer and a Maximum 820 data station. A 7.8 mm×30 cm Waters Ultrastyragel linear gel column packed with less than 10 μm particle size mixed pore size crosslinked styrene divinylbenzene copolymer maintained at 25° C. was used for the analysis. The eluting solvent was HPLC grade THF at a flow rate of 0.6 mL/minute. The retention times were calibrated against at least five appropriate known monodisperse polystyrene standards whose $M_w/M_n$ were less than 1.09.

Thermogravimetry (TG): The TG of the polymer was carried out on a Perkin-Elmer TGS-2 instrument at a nitrogen flow rate of 40 $cm^3$/minute. The temperature program for the analysis was 50° C. for 10 minutes followed by an increase of 4° C./minute to 850° C.

Elemental Analysis: Elemental Analysis was performed by Galbraith Laboratories, Knoxville, Tenn.

Gas liquid phase chromatography (GLPC): GLPC analyses were carried out on a Gow-Mac 550 GC equipped with a ¼"×10' stainless steel column packed with 10% SE-30 on Chromosorb W NAW 60/80 mesh. The column was deactivated immediately prior to use by injection of 50 μL of hexamethyldisilazane.

High resolution mass spectra: High resolution mass spectra were obtained at the University of California, Riverside Mass Spectrometry Facility on a VG 7070 EHF mass spectrometer at an ionizing voltage of 20 eV. Exact masses were determined by peak matching against known masses of perfluorokerosene.

THF was distilled from a blue solution of sodium benzophenone ketyl immediately prior to use. Hexamethylphosphoramide (HMPA) was distilled from calcium hydride and stored over a 4 Å molecular sieves. Hexane was distilled from $LiAlH_4$.

n-Butyllithium in hexane (2.5 mol 1$^{-1}$) and potassium tertbutoxide (from Aldrich) were used as received. Dichloromethylsilane, dichlorophenylsilane, trichlorosilane and other silanes (from Petrarch Systems) were purified by fractional distillation.

All reactions were carried out under an Argon atmosphere. All glassware was flame-dried immediately prior to use.

EXAMPLE 1

1-Phenyl-1-silacyclopent-3-ene

In a 500 mL two neck rb flask equipped with a reflux condenser, a Teflon covered magnetic stirring bar and a rubber septum was placed magnesium powder (9.6 g, 0.4 mol), phenyldichlorosilane (35.4 g, 0.2 mol) and THF (300 mL). The reflux condenser was connected to a refrigeration unit. Ethylene glycol cooled to −20° C. was circulated through the reflux condenser. 1,3-Butadiene (15.1 g, 0.28 mol) was condensed at −78° C. into a volumetric flask which was sealed with a rubber septum. The 1,3-butadiene was transferred into the reaction via a cannula. The reaction mixture was stirred at rt for 24 h. Ether (2×100 mL) was added. The organic solution was decanted from the magnesium chloride salts. There were transferred to a sintered glass funnel and were washed with ether (100 mL). The combined organic solution was washed with water (2×50 mL), dried over anhydrous magnesium sulfate, filtered and the volatile solvents removed by evaporation under reduced pressure. The residue was purified by distillation through a 10 cm vacuum jacketed Vigreux column. A fraction, bp 87° C./5 mm, 6.0 g, 19% yield, was collected.

EXAMPLE 2

1-Methyl-1-Phenyl-1-Silacyclopent-3-ene

In a 500 mL two neck rb flask equipped with a reflux condenser, a Teflon covered magnetic stirring bar and a rubber septum was placed magnesium powder (9.6 g, 0.4 mol), methylphenyldichlorosilane (38.2 g, 0.2 mol) and THF (300 mL). The reflux condenser was connected to a refrigeration unit. Isopropyl alcohol cooled to −20° C. was circulated through the reflux condenser. 1,3-Butadiene (15.1 g, 0.28 mol) was condensed at −78° C. into a volumetric flask which was sealed with a rubber septum. The 1,3-butadiene was transferred into the reaction via a cannula. The reaction mixture was stirred at rt for 24 h. Ether (2×100 mL) was added. The organic solution was decanted from the magnesium chloride salts. These were transferred to a sintered glass funnel and were washed with ether (100 mL). The combined organic solution was washed with water (2×50 mL), dried over anhydrous magnesium sulfate, filtered and the volatile solvents removed by evaporation under reduced pressure. The residue was purified by distillation through a 10 cm vacuum jacketed Vigreux column. The expected compound (boiling point 85°-87° C. at 4 mm Hg, 22.6 g, 65% yield) was collected.

EXAMPLE 3

Preparation of copoly(1-Methyl-1-phenyl-1-sila-cis-pent-3-ene and 1-Phenyl-1-sila-cis-pent-3-ene)

(I) In a 100 rb flask equipped with a Teflon covered magnetic stirring bar and a rubber septum was placed 1-methyl-1-phenyl-1-silacyclopent-3-ene 1.5 g (8.6 mmol), 1-phenyl-1-silacyclopent-3-ene 0.13 g (0.81 mmol), THF (50 mL) distilled from deeply blue color benzophenone ketyl and HMPA (60 μL). The mixture was cooled to −78° C. and a hexane solution of n-butyllithium 0.1 mL (2.5M, 0.25 mmol) was added via a syringe. The reaction mixture was stirred at −78° C. for 1 h. A saturated solution of aqueous ammonium chloride (20 mL) and ether (30 mL) were added. The organic layer was separated, washed with water (20 mL), dried over anhydrous magnesium sulfate, filtered and the volatile solvents removed by evaporation under reduced pressure. The residue was dissolved in a minimum amount of THF and the polymer was precipitated from methanol. The process was repeated twice. Dried under vacuum. In this way, 1.3 g, 65% yield of copolymer, $M_w/M_n = 6,000/4,500$ was obtained. The ratio of 1-phenyl-1-methyl-1-sila-cis-pent-3-ene units to 1-phenyl-1-sila-cis-pent-3-ene units in the copolymers was determined by integration of the $^1$H NMR spectra. Comparison of the $^1$H NMR integration of the vinyl signals to the silicon hydrogen signals gives the ratio of 1-phenyl-1-methyl-1-sila-cis-pent-3-ene to 1-phenyl-1-sila-cis-pent-3-ene units in the copolymers 9/1. The thermal stability of I has been determined in an inert nitrogen. In nitrogen, I is stable to 350° C. Above 350° C. rapid weight loss occurs. By 450° C., only eight percent of the initial weight of I is remained. $T_g = -16.25°$ C.

EXAMPLE 4

(II) 1-Phenyl-1-silacyclopent-3-ene 0.4 g (2.5 mmol), 1-methyl-1-phenyl-1-silacyclo-pent-3-ene 0.6 g (3.4 mmol) and HMPA 40 μL reacted with n-butyllithium 0.05 mL, 2.5M, 0.13 mmol) in hexane at −78° C. as above. 0.75 g, 75% yield of copolymer, $M_w/M_n = 2,000/1,700$ was obtained. The ratio of 1-phenyl-1-methyl-1-sila-cis-pent-3-ene units to 1-phenyl-1-sila-cis-pent-3-ene units is 68/32. $T_g = -25.20°$ C.

We claim:

1. A poly(unsaturated carbosilane) copolymer comprising repeating units of the formula

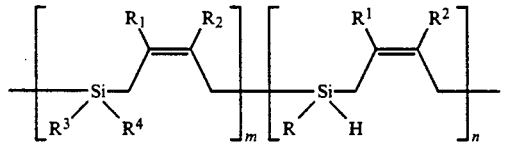

wherein

R is hydrogen, alkyl having from 1 to 4 carbon atoms or phenyl;

$R^1$ is hydrogen, alkyl having 1 to 4 carbon atoms, phenyl or halogen;

$R^2$ is hydrogen; or $R^1$ and $R^2$ together form a phenyl ring;

$R^3$ and $R^4$ are alkyl having from 1 to 4 carbon atoms or phenyl;

m and n are integers whose sum is at least 10 and the ratio of m/n is about 1/9 to about 9/1.

2. A poly(unsaturated carbosilane) copolymer according to claim 1 wherein R is methyl, $R^1$ and $R^2$ are hydrogen, and $R^3$ and $R^4$ are methyl.

3. A poly(unsaturated carbosilane) copolymer according to claim 1 wherein R is phenyl, $R^1$ and $R^2$ are hydrogen, $R^3$ is methyl, and $R^4$ is phenyl.

4. A poly(unsaturated carbosilane) copolymer according to claim 1 wherein R is phenyl $R^1$ and $R^2$ are hydrogen, and $R^3$ and $R^4$ are methyl.

5. A poly(unsaturated carbosilane) copolymer according to claim 1 wherein R is methyl, $R^1$ and $R^2$ together form a phenyl ring, and $R^3$ and $R^4$ are methyl.

6. A poly(unsaturated carbosilane) copolymer according to claim 1 wherein R is methyl, $R^1$ and $R^2$ together form a phenyl ring, $R^3$ is methyl and $R^4$ is phenyl.

7. A poly(unsaturated carbosilane) copolymer comprising repeating units of the formula

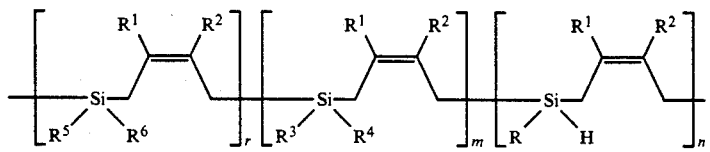

wherein
- R is hydrogen, alkyl having 1 to 4 carbon atoms or phenyl;
- $R^1$ is hydrogen, alkyl having 1 to 4 carbon atoms, phenyl or halogen;
- $R^2$ is hydrogen or $R^1$ and $R^2$ together with adjacent carbon atoms form a phenyl;
- $R^3$, $R^4$, $R^5$ and $R^6$ are independent of one another are alkyl having 1 to 4 carbon atoms or phenyl, with the proviso that both $R^5$ and $R^6$ are not identical to $R^3$ and $R^4$;
- r, m and n are integers with the sum of r and m+n being at least 10 and the ratio of r/m+n ranging from about 1/9 to 9/1.

8. A poly(unsaturated carbosilane) copolymer according to claim 7 wherein R is methyl, $R^1$ and $R^2$ are hydrogen, and $R^3$ and $R^4$ are methyl.

9. A poly(unsaturated carbosilane) copolymer according to claim 7 wherein R is phenyl, $R^1$ and $R^2$ are hydrogen, $R^3$ is methyl, and $R^4$ is phenyl.

10. A poly(unsaturated carbosilane) copolymer according to claim 7 wherein R is phenyl, $R^1$ and $R^2$ are hydrogen, and $R^3$ and $R^4$ are methyl.

11. A poly(unsaturated carbosilane) copolymer according to claim 7 wherein R is methyl, $R^1$ and $R^2$ together form a phenyl ring, and $R^3$ and $R^4$ are methyl.

12. A poly(unsaturated carbosilane) copolymer according to claim 7 wherein R is methyl, $R^1$ and $R^2$ together form a phenyl ring, $R^3$ is methyl and $R^4$ is phenyl.

13. A method for preparing a poly(carbosilane) polymer comprising repeating units of the formula:

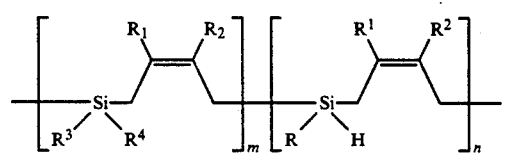

wherein
- R is hydrogen, alkyl having 1 to 4 carbon atoms or phenyl,
- $R^1$ is hydrogen, alkyl having 1 to 4 carbon atoms, phenyl or halogen, or $R^1$ and $R^2$ combined form a phenyl ring, m and n are integers whose sum is at least 10 and the ratio of m/n is about 1/9 to about 9/1, said process comprising polymerizing n moles of monomers of the formula

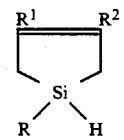

with m moles of monomers of the formula

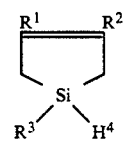

with an anionic ring opening catalyst system.

14. The method according to claim 13 wherein the anionic ring opening catalyst system is an organometallic base and cation coordinating ligand catalyst system.

* * * * *

UNITED STATES PATENT AND TRADEMARK OFFICE
CERTIFICATE OF CORRECTION

PATENT NO. : 5,171,810
DATED : December 15, 1992
INVENTOR(S) : Weber, et al

It is certified that error appears in the above-indentified patent and that said Letters Patent is hereby corrected as shown below:

Column 10, line 22 after "phenyl ring," insert: -- $R_3$ and $R_4$ are an alkyl radical containing one to four carbon atoms or phenyl, --

Column 10, lines 36-43 delete the formula and insert:

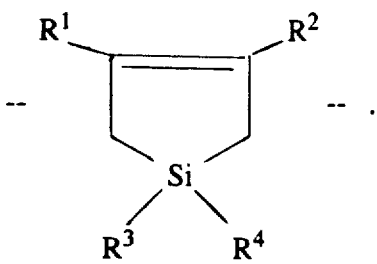

Signed and Sealed this

Twenty-eighth Day of December, 1993

Attest:

BRUCE LEHMAN

Attesting Officer

Commissioner of Patents and Trademarks